(12) United States Patent
Hirai et al.

(10) Patent No.: US 7,891,879 B2
(45) Date of Patent: Feb. 22, 2011

(54) HUB WHEEL OF A WHEEL BEARING APPARATUS AND A MANUFACTURING METHOD THEREOF

(75) Inventors: Isao Hirai, Iwata (JP); Takayasu Takubo, Iwata (JP); Kiyotake Shibata, Iwata (JP); Syougo Suzuki, Iwata (JP)

(73) Assignee: NTN Corporation (JP)

( * ) Notice: Subject to any disclaimer, the term of this patent is extended or adjusted under 35 U.S.C. 154(b) by 0 days.

(21) Appl. No.: 12/487,777

(22) Filed: Jun. 19, 2009

(65) Prior Publication Data
US 2009/0252447 A1 Oct. 8, 2009

Related U.S. Application Data

(63) Continuation of application No. PCT/JP2007/001384, filed on Dec. 12, 2007.

(30) Foreign Application Priority Data

Dec. 20, 2006 (JP) ............................. 2006-342205
May 22, 2007 (JP) ............................. 2007-135561

(51) Int. Cl.
*F16C 33/64* (2006.01)
*B21D 53/10* (2006.01)
(52) U.S. Cl. ................. 384/544; 29/898.066
(58) Field of Classification Search ............ 384/544, 384/589, 513; 29/898.066
See application file for complete search history.

(56) References Cited

U.S. PATENT DOCUMENTS

2007/0065065 A1   3/2007   Ohtsuki et al.

FOREIGN PATENT DOCUMENTS

| JP | 2001-113906 | 4/2001 |
|----|-------------|--------|
| JP | 2001-163003 | 6/2001 |
| JP | 2002-087008 | 3/2002 |
| JP | 2005-003061 | 1/2005 |
| JP | 2005-083513 | 3/2005 |
| JP | 2005-088668 | 4/2005 |

*Primary Examiner*—Thomas R Hannon
(74) *Attorney, Agent, or Firm*—Harness, Dickey & Pierce, P.L.C.

(57) ABSTRACT

A wheel hub of a wheel bearing apparatus has an outer member and an inner member. The inner member includes a wheel hub and an inner ring. The wheel hub has a wheel mounting flange, a shaft portion, an inner raceway surface, a cylindrical portion, a shoulder portion, and a through bore. The inner ring is press-fit onto the cylindrical portion abutting against the shoulder portion. Double row rolling elements are contained between the inner and outer raceway surfaces of the inner member and the outer member. Fiber flow near the inner circumference of the material forming the wheel hub from the shoulder to the open end surface of the wheel hub is in a condition substantially parallel to the axis of the wheel hub.

10 Claims, 9 Drawing Sheets

[ Fig 1 ]
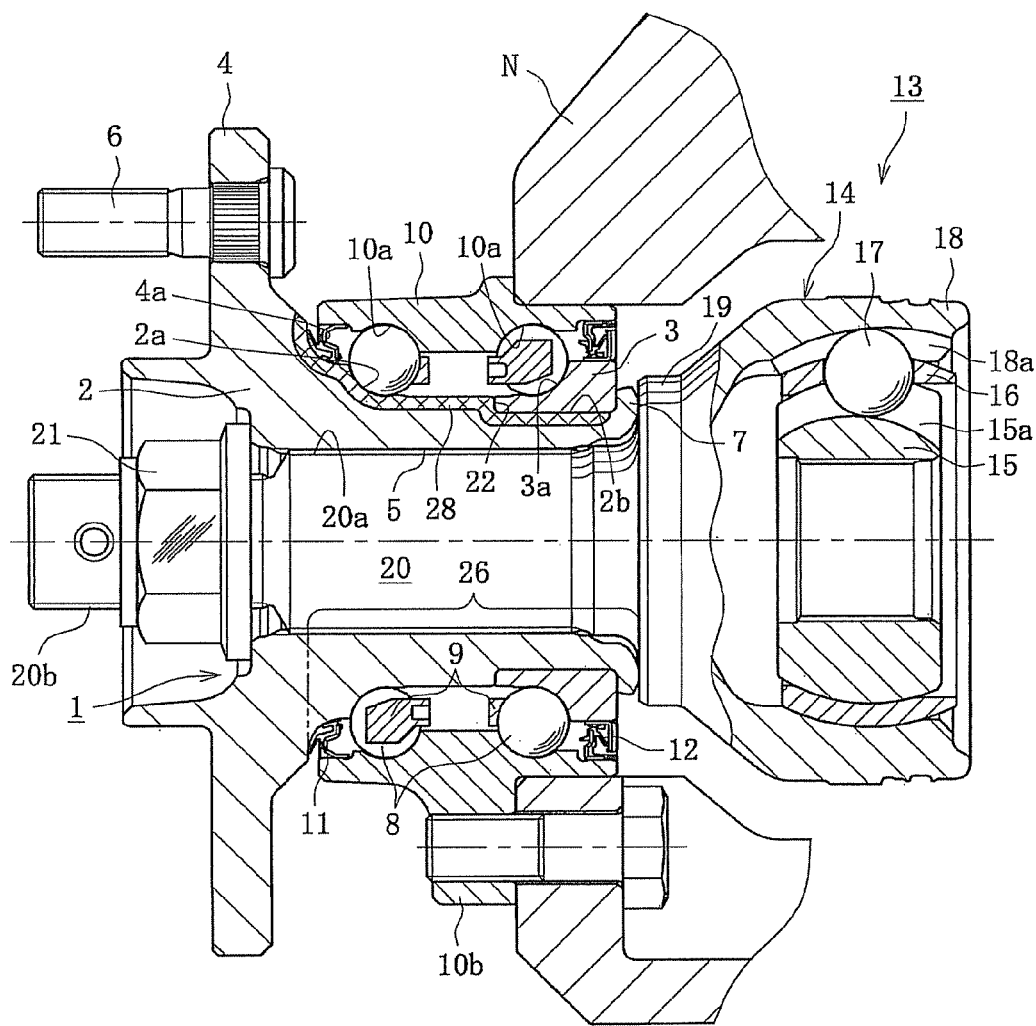

[ Fig 2 ]
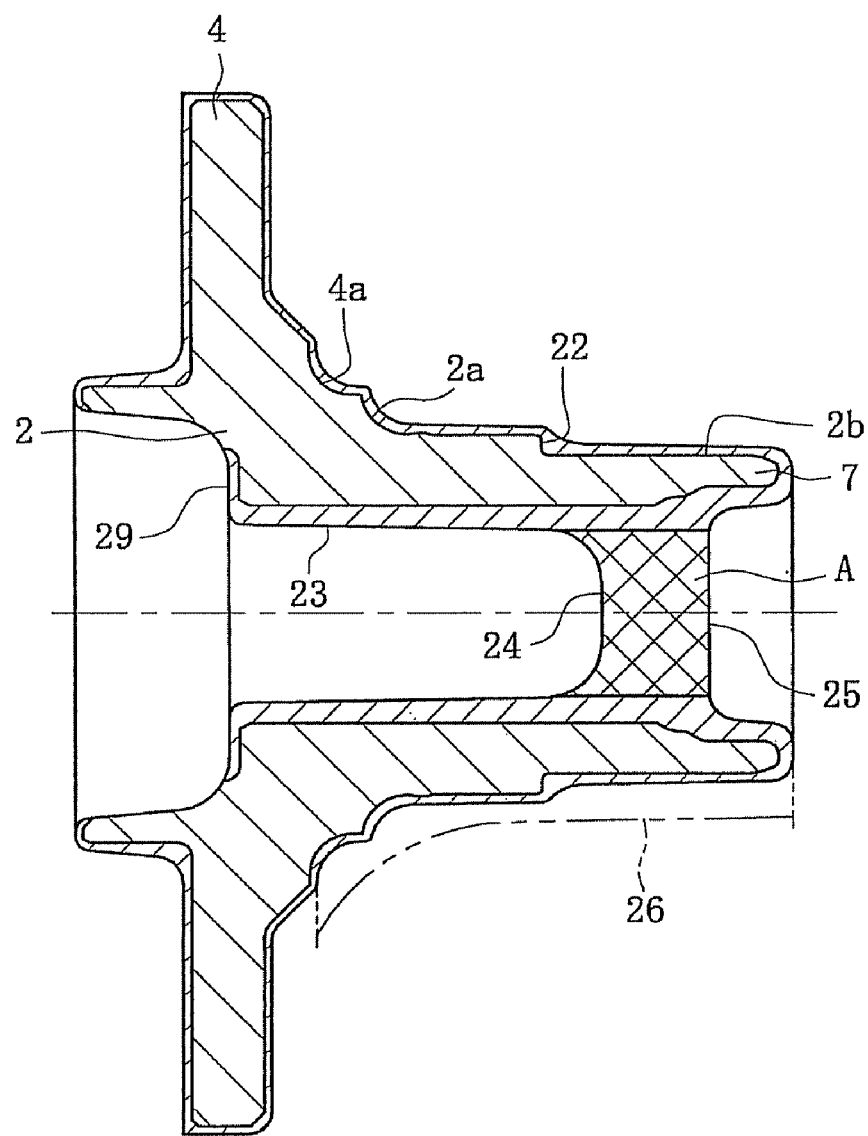

[Fig 3]
(a)
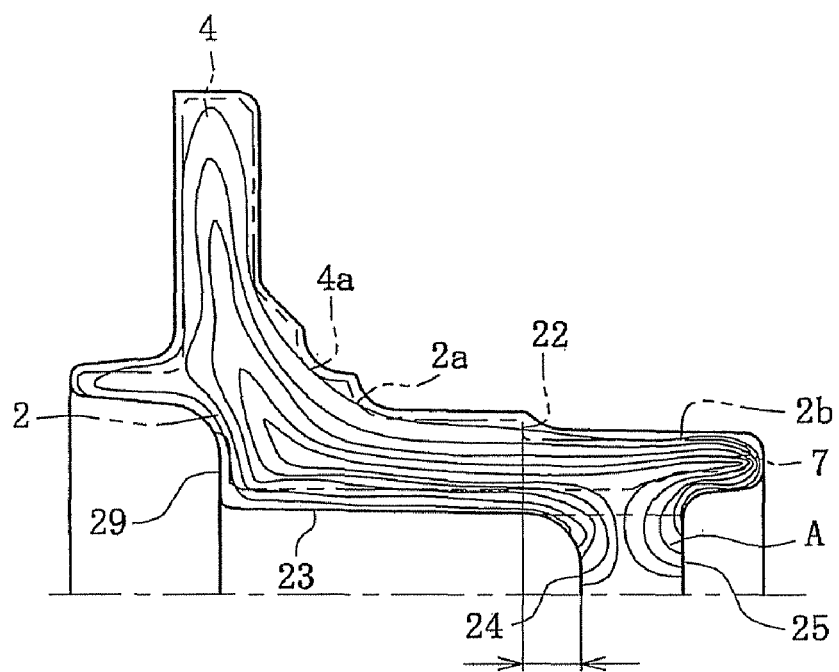
(b)
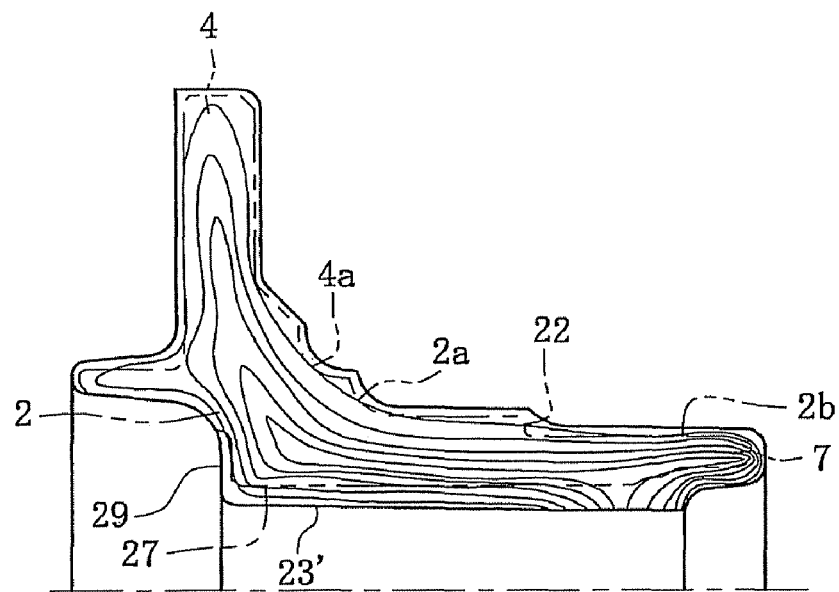

[Fig 4]
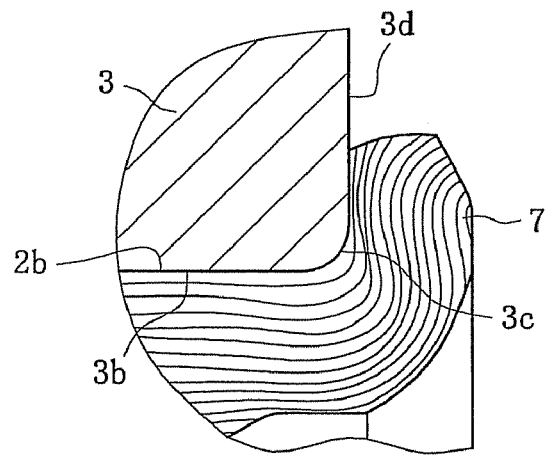
[Fig 5]
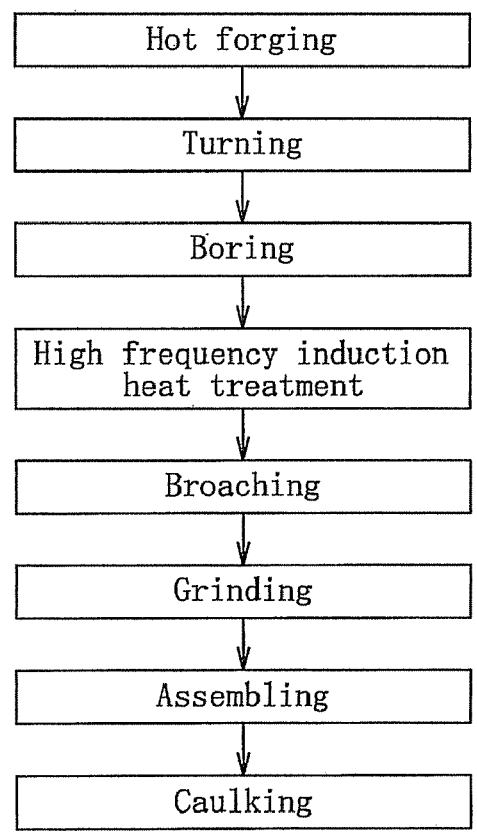

[Fig 6]
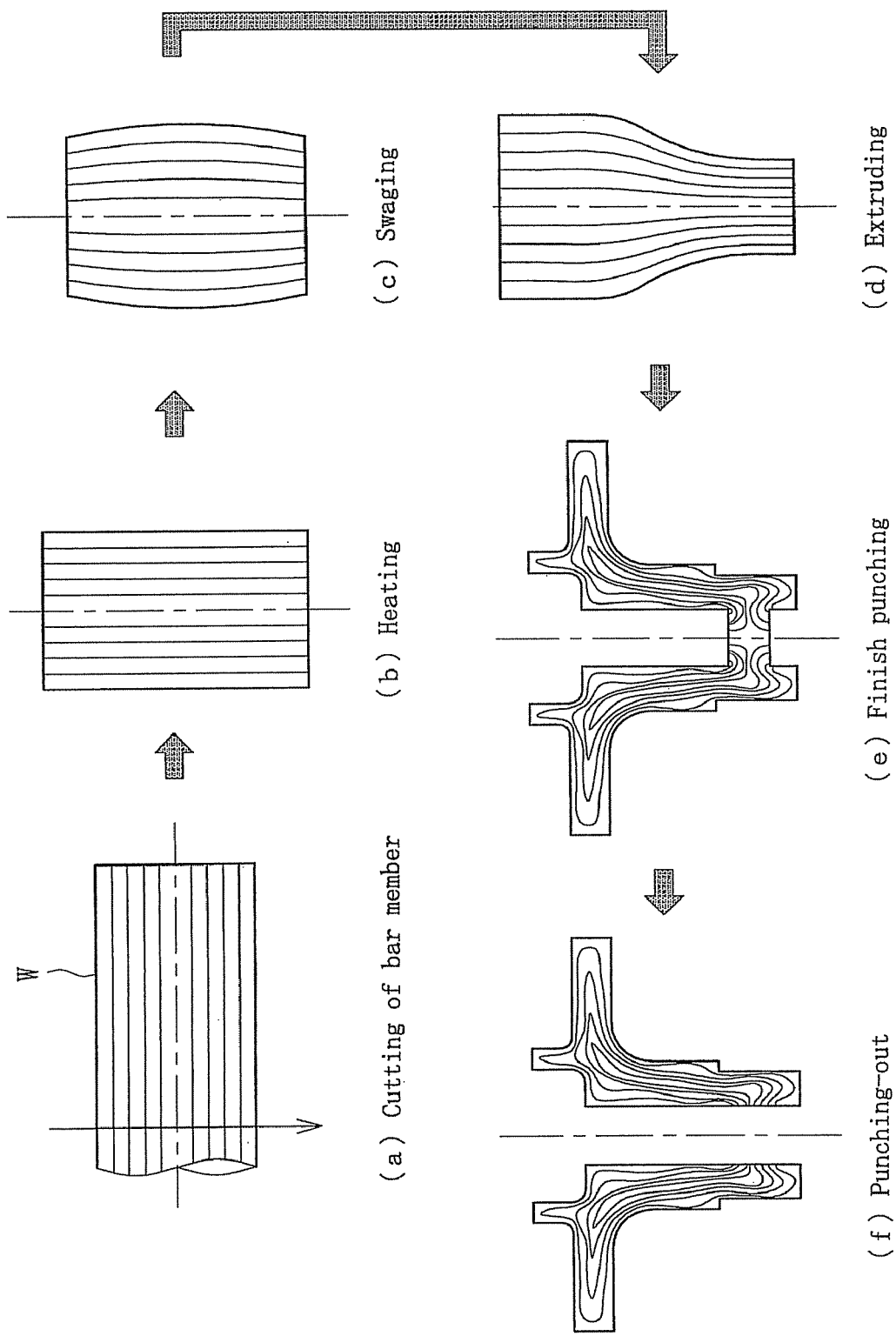

[Fig 7]
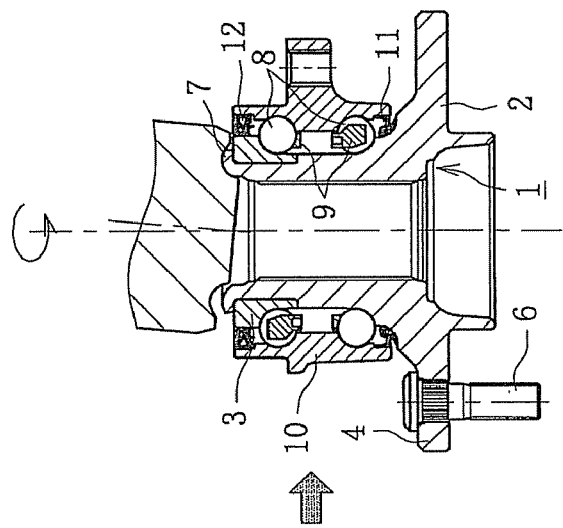
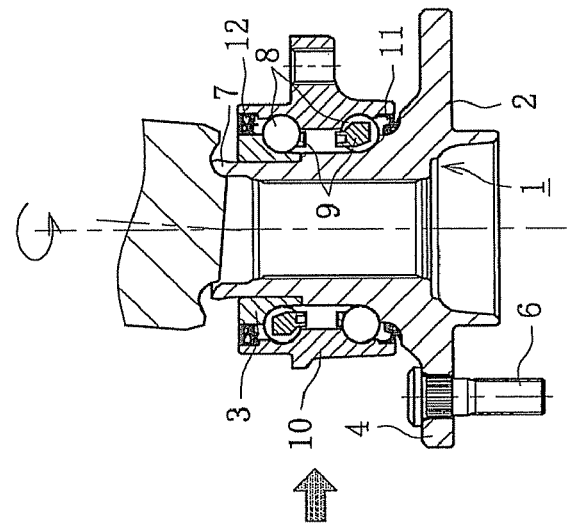
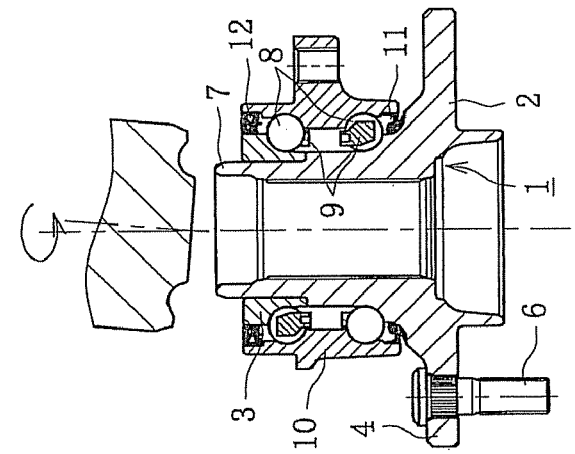

[Fig 8]
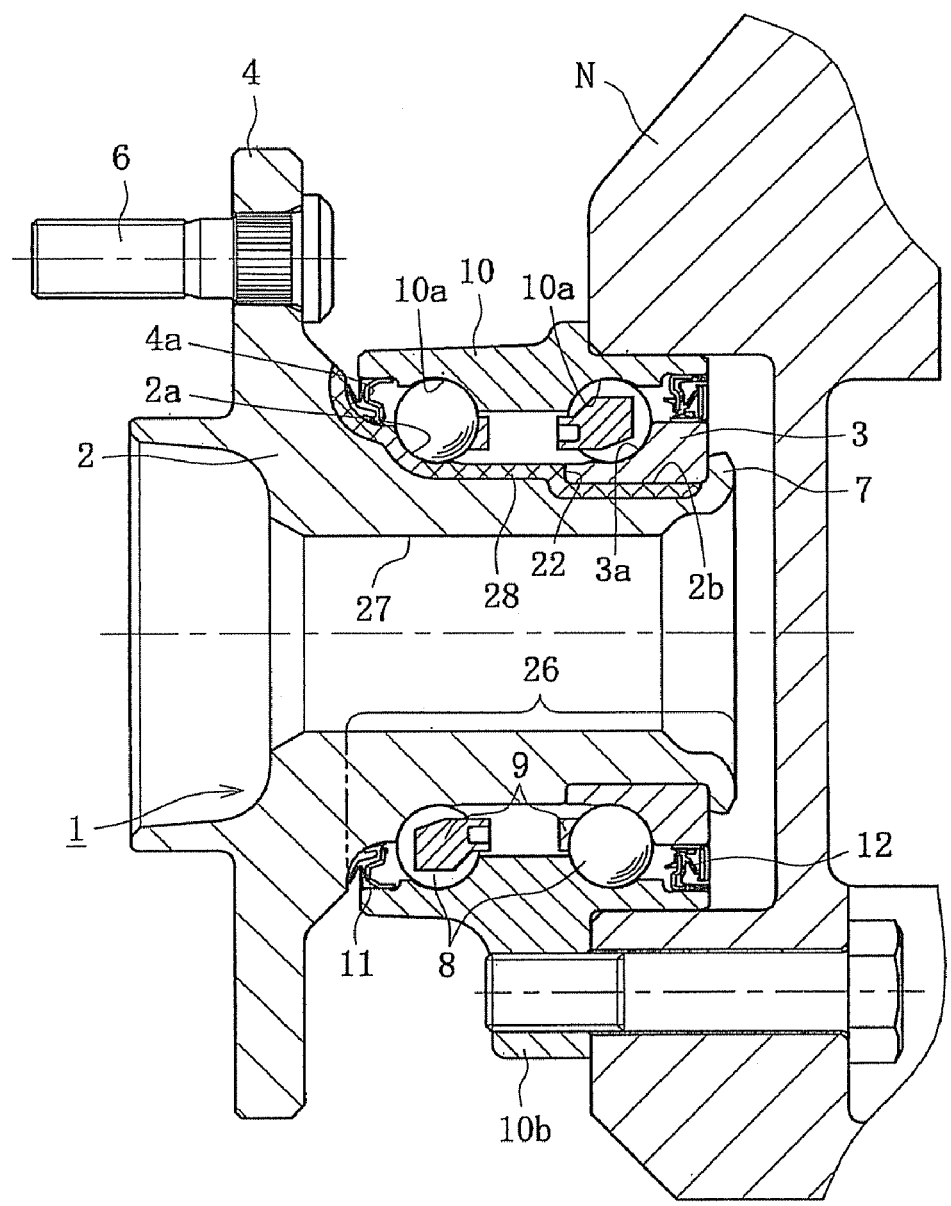

[Fig 9]
PRIOR ART
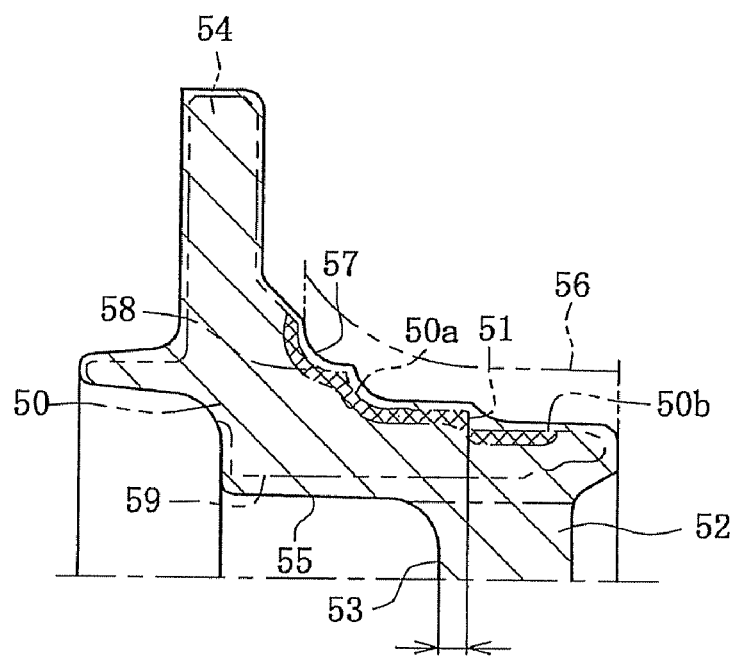

[Fig 10]
(a)
PRIOR ART
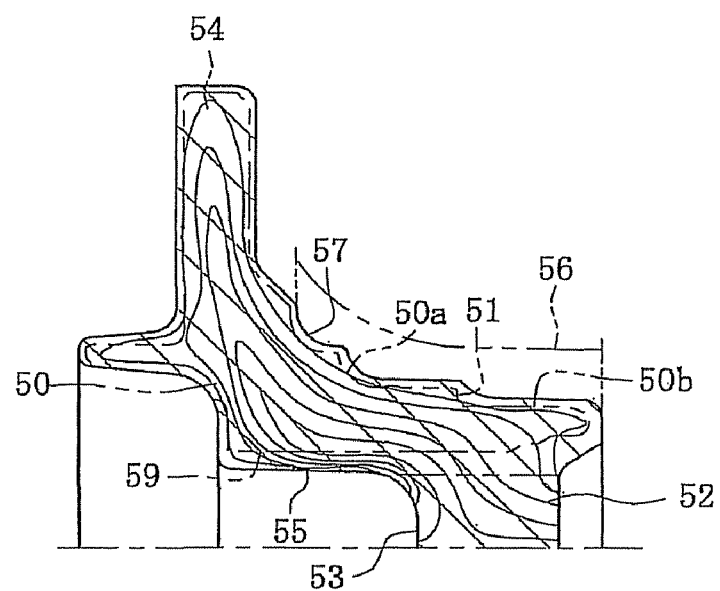
(b)
PRIOR ART
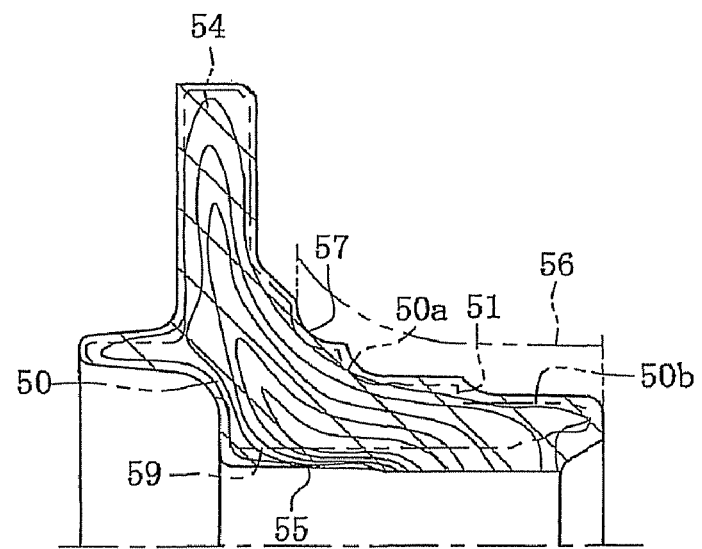

HUB WHEEL OF A WHEEL BEARING APPARATUS AND A MANUFACTURING METHOD THEREOF

CROSS-REFERENCE TO RELATED APPLICATIONS

This application is a continuation of International Application No. PCT/JP2007/001384, filed Dec. 12, 2007, which claims priority to Japanese Application Nos. 2006-342205, filed Dec. 20, 2006 and 2007-135561, filed May 22, 2007. The disclosures of the above applications are incorporated herein by reference.

FIELD

The present disclosure relates to a wheel hub of a wheel bearing apparatus and, more particularly, to a wheel hub of a wheel bearing apparatus with a wheel mounting flange and one inner raceway surface on its outer circumference and to a method of manufacturing the wheel hub.

BACKGROUND

It is desired to have a light weight bearing apparatus that is compact and highly durable that provides fuel consumption efficiency and performance for automobiles. There are driven wheel types and drive wheel types of automobile wheel bearing apparatus. Weight reduction of the bearing apparatus for a driven wheel has been achieved by reducing the thickness of the wheel hub wheel mounting flange and by forming a through bore. In addition, a driving wheel bearing apparatus having a wheel hub with a reduced thickness wheel mounting flange and a serrated through bore is generally used. In the driven wheel bearing apparatus, a stationary ring is adapted to be secured on a body of the vehicle and a rotational ring is connected to support and rotate a wheel of the vehicle. On the other hand, in the driving wheel bearing apparatus, a stationary ring is adapted to be secured on a body of the vehicle and a rotational ring is connected to support and rotate a wheel of the vehicle while transmitting the engine power to the driving wheel.

There are four generation types of wheel bearing apparatus. A first generation type has a wheel bearing including a double row angular contact ball bearing fit between a knuckle, forming a portion of a suspension apparatus, and a wheel hub. A second generation type has a body mounting flange or a wheel mounting flange directly formed on the outer circumference of an outer member. A third generation type has one inner raceway surface directly formed on the outer circumference of a wheel hub. A fourth generation type has inner raceway surfaces formed on the outer circumferences, respectively, of a wheel hub and an outer joint member.

In the wheel bearing apparatus of the third generation type, a wheel hub is integrally formed with a wheel mounting flange. An inner raceway surface is formed directly on an outer circumference of a shaft portion extending from the base of the wheel mounting flange. The wheel hub generally has several machining steps performed on it, e.g., removing surface scale by shot blasting after being formed by forging, turning several functional portions such as the inner raceway surface by a dedicated turning line, and transferring to a high frequency induction quenching step and a grinding step. The wheel hub is usually made of steel such as S53C. Portions of the wheel hub, such as the inner raceway surface, are finally hardened by a high frequency quenching.

In such a wheel bearing apparatus of a third generation type, one problem is its durability as a structure for rotationally supporting the wheel hub. Methods to improve the durability of the wheel hub have been proposed. For example, technology providing hardened layers on an outer circumference of a shaft portion of a wheel hub and on a root region of a wheel mounting flange and brake pilot has been disclosed (see Patent Document 1 below). Also, technology providing a hardened layer on an outer circumference (including an inner raceway surface) of a shaft portion of a wheel hub and thermal refining a non-hardened portion has been disclosed (see Patent Document 2 below). In addition, the wheel hub is required to have a raceway function of a rolling bearing. Thus, a wheel bearing apparatus where the inclination angle has been proposed where fiber flow in an inner raceway surface of a wheel hub is set at 15° or less. Also proposed is a reduction in the machining allowance of the inner raceway surface to reduce the amount of material forming the wheel hub and a time required for the cutting process (see Patent Document 3 below). Patent Document 1: Japanese Laid-open Patent Publication No. 87008/2002. Patent Document 2: Japanese Laid-open Patent Publication No. 3061/2005. Patent Document 3: Japanese Laid-open Patent Publication No. 83513/2005

An improvement in durability and the life of rolling fatigue of the wheel hub can be achieved by the technologies disclosed in the Patent Documents 1~3 above. However, further problems exist in the manufacturing process of a wheel hub that will be described with reference to FIG. 9. A wheel hub 50 is finally finished to a configuration as shown by a two-dotted line and a shoulder portion 51. An inner ring (not shown) is abutted against the shoulder portion 51. A cylindrical portion 50b extends from the shoulder portion 51. Repeating moment loads applied to the wheel mounting flange 54 of the wheel hub 50 are transmitted to a shaft portion 56 that extends from the base of the wheel mounting flange 54. The loads repeatedly cause elastic deformation on the wheel hub 50. Thus, repeated bending stress is generated in the shoulder portion 51 of the wheel hub 50. To assure a desired strength of the wheel hub 50, it is hardened by high frequency induction quenching to form a hardened layer 58 on an outer circumference of the shaft portion 56 in a region from an inner side base corner 57 (seal land portion) of the wheel mounting flange 54 to the cylindrical portion 50b, via an inner raceway surface 50a and the shoulder portion 51.

It is a usual manner to provide a through bore in an inner circumference 59 of the shaft portion 56 of wheel hub 50 to reduce the weight of the wheel hub 50 or to form a serration for torque transmission in a driving wheel bearing apparatus. In either case, the wall thickness of the cylindrical portion 50b where the inner ring is fit is reduced by the provision of the trough bore. A necessary strength of the cylindrical portion 50b is assured by providing the hardened layer 58. However, it is possible that cracks may be caused on the inner circumference 59 corresponding to the shoulder portion 51 where maximum deformation of the shaft portion 56 is exposed to the generation of high repeating stress.

In fact, the wheel hub 50 is forged with portions to be finished late to form the inner raceway surface 50a on the outer circumference of the shaft portion 56 and to form the cylindrical portion 50b. Finally, the wheel hub 50 is punched to form an inner circumference 55 with a remaining partition wall 52 to be later punched out. In this step, since an outer side wall surface 53 of the partition wall 52 is formed more on the outer side than the shoulder portion 51, as shown in FIG. 10 (a), the fiber flow of the wheel hub 50 is formed to be inclined along a direction from the shoulder portion 51 to the partition wall. The partition wall 52 is removed by the punching-out step. The inner circumference 55 is formed as a through bore (see FIG. 10 (*b*)). Thus, the fiber flow in a portion opposite to the shoulder 51 exhibit a condition cut at an angle about 50°~80°. In addition, a trimming step, to remove burrs (not shown) on the outer circumference of the wheel mounting flange, is performed directly before or directly after or simultaneously with the punching-out step.

In general, it is known that higher strength against rotating bending fatigue and impact bending can be obtained in a case where the fiber flow is parallel with the direction of the bending stress than a case where the fiber flow is vertical to the direction of the bending stress. Accordingly, it is difficult to have a predetermined strength in the inner circumference 55 where the fiber flow is not parallel relative to its axis. It may be appreciated to harden, by high frequency quenching, the through bore of the shaft portion 56 after the turning step to increase the strength. However, it not only causes an increase in manufacturing cost of the wheel bearing and in the generation of strain due to the heat treatment but reduces the impact resistance of the shaft portion 56 due to the quenching defect. Accordingly, the thickness of the cylindrical portion 50*b* must be increased in practice to obtain sufficient strength.

SUMMARY

It is, therefore, an object of the present disclosure to provide a wheel hub of a wheel bearing apparatus and a manufacturing method that can reduce the amount of material of the wheel hub and improve its strength.

A wheel hub of a wheel bearing apparatus is provided comprising an outer member formed, on its inner circumference, with double row outer raceway surfaces. An inner member includes a wheel hub and an inner ring. The wheel hub has a wheel mounting flange at one end. A shaft portion axially extends from a base of the wheel mounting flange toward the inner side of the wheel bearing apparatus. An inner raceway surface, arranged opposite to one of the double row outer raceway surfaces, is formed on the outer circumference of the shaft portion. A cylindrical portion axially extends from the inner raceway surface, via a shoulder portion, toward the inner side of the wheel bearing apparatus. A through bore alone or a through bore formed, on its inner circumference, with a serration for torque transmission is formed in the wheel hub. An inner ring is press-fit onto the cylindrical portion and is abutted against the shoulder portion of the wheel hub. The inner ring, on its outer circumference, includes another inner raceway surface arranged opposite to the other of the outer raceway surfaces. Double row rolling elements are contained between the inner and outer raceway surfaces of the inner member and the outer member. Fiber flow near the inner circumference of the material forming the wheel hub from the shoulder to the open end surface of the wheel hub is in a condition substantially parallel to the axis of the wheel hub.

The wheel hub of wheel bearing apparatus is of the third generation type. It comprises a wheel hub and an inner ring. The wheel hub has a wheel mounting flange at one end. A shaft portion axially extends from a base of the wheel mounting flange toward the inner side of the wheel bearing apparatus. An inner raceway surface is arranged opposite to one of the double row outer raceway surfaces. It is formed on the outer circumference of the shaft portion. A cylindrical portion axially extends from the inner raceway surface, via a shoulder portion, toward the inner side of the wheel bearing apparatus. A through bore is formed on the wheel hub inner circumference to reduce the weight of the wheel hub or to form serrations for torque transmission. The inner ring is press-fit onto the cylindrical portion and abuts against the shoulder portion of the wheel hub. The inner ring is formed, on its outer circumference, with another inner raceway surface arranged opposite to the other of the outer raceway surfaces. The fiber flow near the inner circumference of the material forming the wheel hub, from the shoulder to the open end surface of the wheel hub, is in a condition substantially parallel to the axis of the wheel hub. Thus, it is possible to increase the strength of the wheel hub against rotating bending fatigue resistance and impact bending resistance. Also, it is possible to reduce the wall thickness of the cylindrical portion to a minimum which, in turn, reduces the amount of material of the wheel hub. In addition, it is also possible to improve the strength and durability of the serrations formed on the through passage in the case of a bearing apparatus for a driving wheel.

The fiber flow is in a condition substantially parallel to the axis of the wheel hub in the shoulder portion on the outer circumference of the shaft portion that extends from the base of the wheel mounting flange of the wheel hub. Thus, it is possible to increase the strength of the shoulder portion against rotating bending fatigue resistance and to improve the strength and durability of the serrations formed on the through passage in the case of a bearing apparatus for a driving wheel. Additionally, it reduces the wall thickness of the cylindrical portion to a minimum and, in turn, reduces the amount of material of the wheel hub.

The inner ring is axially secured by a caulked portion. The caulked portion is formed by plastically deforming the end of the cylindrical portion of the wheel hub. The caulked portion intimately contacts against a region, from an inner circumference to an end face, through a chamfered portion of the inner ring without the fiber flow in the caulked portion being broken. Thus, it is possible to prevent the generation of damage, such as cracks, against the repeated stress. Thus, this increases the strength of the caulked portion.

A method for manufacturing a wheel hub of a wheel bearing is provided. The wheel hub has a wheel mounting flange at one end. A shaft portion axially extends from a base of the wheel mounting flange toward the inner side of the wheel bearing apparatus. An inner raceway surface is formed on the outer circumference of the shaft portion. A cylindrical portion axially extends from the inner raceway surface, via a shoulder portion, toward the inner side of the wheel bearing apparatus. A through bore alone or a through bore is formed on the wheel hub inner circumference with a serration for torque transmission. The method comprises steps of cutting an axially rolled bar member having a fiber flow in an axial direction in a direction vertical to that of the fiber flow to form a billet. Heating the billet formed by cutting the bar member. Swaging the heated billet by pressing both of its ends to expand its middle portion to have a barrel-like configuration. The swaged blank is extruded to reduce its inner side diameter. The extruded blank is finish stamped by die forging to form an outline of the wheel hub including the wheel mounting flange, the shaft portion, the shoulder portion, the cylindrical portion, and an inner circumference having a partition wall. After the finish-stamping step, the partition wall is formed so that its outer side wall surface is positioned more inner side than the position of the shoulder portion. Finally, the partition wall is punched out to form the through bore.

In the method for manufacturing the wheel hub, the partition wall is formed so that its outer side wall surface is positioned more inner side than the position of the shoulder portion during the finish-stamping step. The fiber flow of the Wheel hub is arranged so that it is moderately inclined from the shoulder portion to the outer side wall of the partition wall and substantially axially along the inner circumference. In addition, the inner side wall surface of the partition wall is formed at a position deeply entered into the outer side. The fiber flow of the wheel hub can be arranged so that it is moderately inclined from the inner circumference of the end of the cylindrical portion to the partition wall and substantially axially along the inner circumference. The through bore is finished by turning after the partition wall has been punched out. Accordingly, it is possible to obtain fiber flow from the shoulder portion to the outer side open end face arranged along a substantially axial direction. Thus, this increases the strength against the rotating bending fatigue and the impact bending on the inner circumference opposite to the shoulder portion. Thus, this improves its strength and durability. In addition, it is possible to reduce the wall thickness of the cylindrical portion to minimum. This reduces the amount of material of the wheel hub by providing an opening, by forging, at an end of the cylindrical portion.

The inner side wall surface of the partition wall is formed at a position deeply entered into the outer side of the inner circumference of the caulked portion. Thus, it is possible to arrange the fiber flow along it in an axial direction. The caulked portion intimately contacts against a region of the inner ring from an inner circumference to an end face through a chamfered portion of the inner ring without the fiber flow in the caulked portion being broken. Thus, it is possible to prevent the generation of damage, such as cracks, against the repeated stress. Thus, this improves the strength of the caulked portion.

The wheel hub of wheel bearing apparatus comprises an outer member formed, on its inner circumference with double row outer raceway surfaces. An inner member includes a wheel hub and an inner ring. The wheel hub has a wheel mounting flange at one end. A shaft portion axially extends from a base of the wheel mounting flange toward the inner side of the wheel bearing apparatus. An inner raceway surface, arranged opposite to one of the double row outer raceway surfaces, is formed on the outer circumference of the shaft portion. A cylindrical portion axially extends from the inner raceway surface, via a shoulder portion, toward the inner side of the wheel bearing apparatus. A through bore alone or a through bore formed, on its inner circumference, with serrations for torque transmission, is formed in the wheel hub. The inner ring is press-fit onto the cylindrical portion abutted against the shoulder portion of the wheel hub. The inner ring is formed, on its outer circumference, with another inner raceway surface arranged opposite to the other of the outer raceway surfaces. Double row rolling elements are contained between the inner and outer raceway surfaces of the inner member and the outer member. Fiber flow near the inner circumference of the material forming the wheel hub from the shoulder to the open end surface of the wheel hub is in a condition substantially parallel to the axis of the wheel hub. Thus, it is possible to increase the strength of the wheel hub against rotating bending fatigue resistance and impact bending resistance. Also, it reduces the wall thickness of the cylindrical portion to a minimum. Thus, this reduces the amount of material of the wheel hub.

The method for manufacturing a wheel hub of a wheel bearing comprises steps of swaging a billet by pressing both of its ends to expand its middle portion to have a barrel-like configuration after cutting an axially rolled bar member with the fiber flow in an axial direction. A heated billet is formed by cutting the bar member in a direction vertical to the fiber flow. The swaged blank is extruded to reduce its inner side diameter. The extruded blank is finished-stamped by die forging to form an outline of the wheel hub including the wheel mounting flange, the shaft portion, the shoulder portion, the cylindrical portion, and an inner circumference having a partition wall. After the finish-stamping step, the partition wall is formed so that its outer side wall surface is positioned more inner side than the position of the shoulder portion. The fiber flow in the wheel hub can be arranged so that it is moderately inclined from the shoulder portion to the outer side wall of the partition wall and substantially axially extending along the inner circumference. In addition, since the inner side wall surface of the partition wall is formed at a position deeply entered into the outer side, the fiber flow of the wheel hub can be arranged so that it is moderately inclined from the inner circumference of the end of the cylindrical portion to the partition wall and substantially axially extends along the inner circumference. Accordingly, it is possible to obtain the fiber flow along a substantially axial direction from the shoulder portion to the outer side open end face. Thus, this increases the strength against rotating bending fatigue and the impact bending on the inner circumference opposite to the shoulder portion to improve its strength and durability. In addition, it is possible to improve the strength and durability of the serration of the bearing apparatus for a driving wheel, to reduce a wall thickness of the cylindrical portion to minimum and to reduce the amount of material of the wheel hub.

A method for manufacturing a wheel hub of a wheel bearing wherein a wheel hub has a wheel mounting flange at one end. A shaft portion axially extends from a base of the wheel mounting flange toward the inner side of the wheel bearing apparatus. An inner raceway surface is formed on the outer circumference of the shaft portion. A cylindrical portion axially extends from the inner raceway surface, via a shoulder portion, toward the inner side of the wheel bearing apparatus. A through bore alone or a through bore formed on its inner circumference with serrations for torque transmission is formed in the wheel hub. The method comprises steps of swaging a billet by pressing both ends to expand its middle portion to have a barrel-like configuration after cutting an axially rolled bar member with a fiber flow in an axial direction. A heated billet is formed by cutting the bar member in a direction vertical to the fiber flow. The swaged blank is extruded to reduce its inner side diameter. The extruded blank is finish-stamped by die forging to form an outline of the wheel hub including the wheel mounting flange, the shaft portion, the shoulder portion, the cylindrical portion, and an inner circumference having a partition wall. Finally, the partition wall is punched out to form the through bore. After the finish-stamping step, the partition wall is formed so that its outer side wall surface is positioned more inner side than the position of the shoulder portion.

Further areas of applicability will become apparent from the description provided herein. The description and specific examples in this summary are intended for purposes of illustration only and are not intended to limit the scope of the present disclosure.

DRAWINGS

Additional advantages and features of the present disclosure will become apparent from the subsequent description and the appended claims, taken in conjunction with the accompanying drawings, wherein:

FIG. 1 is a longitudinal section view of a first embodiment of the wheel bearing apparatus for a vehicle.

FIG. 2 is an explanatory view of only the wheel hub of FIG. 1.

FIG. 3(a) is a longitudinal section view of the wheel hub showing the fiber flow during a forging step.

FIG. 3(b) is a longitudinal section view of the wheel hub showing the fiber flow after the forging step.

FIG. 4 is a partial longitudinal section view of the wheel hub showing the fiber flow in the caulked portion.

FIG. 5 is a block diagram showing manufacturing steps of the wheel hub.

FIG. 6 is an explanatory view of the forging step.

FIG. 7 is an explanatory view of the caulking step.

FIG. 8 is a longitudinal section view of a second embodiment of the wheel bearing apparatus for a vehicle.

FIG. 9 is a longitudinal section view of the forging step of a prior art wheel hub.

FIG. 10(a) is a longitudinal section view of the prior art wheel hub showing the fiber flow during a forging step.

FIG. 10(b) is a longitudinal section view of the prior art wheel hub showing the fiber flow after the forging step.

DETAILED DESCRIPTION

A first preferable embodiment of the present disclosure will be hereinafter described with reference to the drawings.

FIG. 1 is a longitudinal section view of a first embodiment of a wheel bearing apparatus for a vehicle. FIG. 2 is an explanatory view of only the wheel hub. FIG. 3(a) is a longitudinal section view of the wheel hub showing the fiber flow during a forging step. FIG. 3(b) is a longitudinal section view of the wheel hub showing the fiber flow after the forging step. FIG. 4 is a partial longitudinal section view of the wheel hub showing the fiber flow in the caulked portion. In the descriptions below, the term "outer-side" defines a side that is positioned outside of a vehicle body (left-hand side of FIG. 1). The term "inner-side" defines a side that is positioned inside of a vehicle body (right-hand side of FIG. 1) when the bearing apparatus is mounted on the vehicle body.

The wheel bearing apparatus includes an inner member 1, an outer member 10, and double row rolling elements (balls) 8, 8 contained between the inner and outer members 1, 10. The inner member 1 includes the wheel hub 2 and an inner ring 3 press-fit onto the wheel hub 2.

The wheel hub 2 is integrally formed on its outer side end with a wheel mount flange 4. The flange 4 mounts a wheel (not shown). A shaft portion 26 extends from the base of the wheel mounting flange 4 to the inner side. One (outer side) inner raceway surface 2a is formed on the shaft portion. A cylindrical portion 2b axially extends from the inner raceway surface 2a. The wheel hub 2 inner circumference includes serrations (or splines) 5 for torque transmission. In addition, hub bolts 6 are secured on the wheel mounting flange 4 at its circumferentially equidistant positions.

The wheel hub 2 is made of medium carbon steel such as S53C including carbon of 0.40~0.80% by weight. It is hardened by high frequency induction quenching to have a hardened layer 28 of a thickness of 0.5~4 mm and a surface hardness of 58~64 HRC. The hardened layer is in a region including, via the inner raceway surface 2a, the outer circumference of the shaft portion 26, seal land portion 4a where the side seal 11 slidably contacts, and the cylindrical portion 2b. The inner ring 3 is press-fit onto the cylindrical portion 2b of the wheel hub 2, via a predetermined interference. It is axially immovably secured by a caulked portion 7. The caulked portion 7 is formed by plastically deforming the end of the cylindrical portion 2b radially outward. The caulked portion 7 is not quenched so that the blank, after forging, has a hardness of 13~25 HRC. The inner ring 3 is formed from high carbon chrome steel such as SUJ2. It is formed, on its outer circumference, with the other (inner side) inner raceway surface 3a. The ring 3 is dip hardened to its core to have a hardness of 58~64 HRC.

The outer member 10 is made of medium carbon steel such as S53C including carbon of 0.40~0.80% by weight. It is formed, on its outer circumference, with an integral body mounting flange 10b adapted to be mounted on a body N of a vehicle. Also, it is formed, on its inner circumference, with double row outer raceway surfaces 10a, 10a opposite to the inner raceway surfaces 2a, 3a of the inner member 1. The double row outer raceway surfaces 10a, 10a are hardened by high frequency induction quenching to have a hardened layer with a surface hardness of 58~64 HRC and a thickness of 1~4 mm. The double row rolling elements 8, 8 are contained between the inner and outer raceway surfaces 10a, 2a; 10a, 3a. They are rollably held by cages 9, 9. The rolling elements 8, 8 are formed of high carbon chrome steel such as SUJ2. They are dip hardened to their core to have a hardness of 60~68 HRC.

Seals 11, 12 are mounted on both ends of the outer member 10 to prevent leakage of grease contained within the bearing apparatus as well as the entry of rain water or dusts into the bearing. Although it is shown, as an example by using a double row angular contact ball bearing as the rolling elements 8, it may be possible to use tapered rollers as the rolling elements 8.

The constant velocity universal joint 13 has an outer joint member 14, a joint inner ring 15, a cage 16, and torque transmitting balls 17. The outer joint member 14 has a cup-shaped mouth portion 18, a shoulder portion 19 forming the bottom of the mouth portion 18 and a stem portion 20 axially extending from the shoulder portion 19. Track grooves 18a, 15a are formed, respectively, on the inner circumference of the mouth portion 18 and the outer circumference of the joint inner ring 15. This forms a constant velocity joint 13 of the stationary type.

The outer joint member 14 is made of medium carbon steel such as S53C including carbon of 0.40~0.80% by weight. The track grooves 18a and the outer circumference region from the stem portion 20 to the shoulder portion 19 are hardened by high frequency induction quenching to have a surface hardness of 58~64 HRC.

The stem portion 20 of the outer joint member 14 is formed, on its outer circumference, with serrations (or splines) 20a adapted to engage the serrations 5 of the wheel hub 2 for torque transmission. An outer screw thread 20b is formed at the end of the serration 20a. The assembly of the outer joint member 14 to the wheel hub 2 can be achieved by inserting the stem portion 20 into the inner member 1 until the shoulder portion 19 of the outer joint member 14 abuts against the caulked portion 7. A securing nut 21 is then fastened onto the outer screw thread 20b.

As shown in FIG. 2, in this embodiment, the wheel hub 2 is manufactured so that it is turned after the forging process. That is, the wheel hub 2 is formed, on its outer side end, with the wheel mounting flange 4, the seal land portion 4a of the shaft portion 26 extending from the base of the wheel mounting flange 4, the inner raceway surface 2a, the shoulder portion 22 and the cylindrical portion 2b with a remaining predetermined turning allowance.

The inner circumference 23 is previously formed as a deep recess, from the outer side opened end to a predetermined position, by finish-stamping using die forging technology. It has a remaining turning allowance of 0.5~1.5 mm to form the serrations (not shown in FIG. 2) by a broaching process. That is, the inner circumference 23 is formed so that the outer side wall surface 24 of the partition wall A is positioned deeply into the inner side beyond a position of the shoulder portion 22 that forms the abutting face against the inner ring 3. In addition, the inner side wall surface 25 of the partition wall A is positioned deeply into the outer side substantially corresponding to the inner circumference of the caulking portion 7.

Accordingly, the fiber flow in the wheel hub 2 is formed so that it is moderately inclined from the shoulder portion 22 to the partition wall A. In particular, the fiber flow from the shoulder portion 22 to the outer side opened end face 29 extends substantially axially along the inner circumference 23, as shown in FIG. 3(a). Thus, as shown in FIG. 3 (b), the fiber flow near the inner circumference 23', after the partition wall A has been punched out, axially extends similar to the case of FIG. 3(a). The fiber flow in the inner circumference 27 can extended axially (maximum 5° relative to the axis of the wheel hub: draft) from the shoulder portion 22 to the outer side opened end face 29. In addition, the fiber flow in the longitudinal sectional plane at the shoulder portion 22 of the wheel hub 2 can be formed so that it extends in a substantially axial direction. The formation of such a fiber flow increases the rotating bending fatigue strength and impact bending strength as well as improves the strength and durability of the serrations. Accordingly, it is possible to set the wall thickness of the cylindrical portion 2b to a minimum and to reduce the amount of material forming the wheel hub 2. The configuration of the finished wheel hub 2 is shown by a two-dotted line in FIG. 3.

In addition, since the inner side wall surface 25 of the partition wall A is positioned deeply into the outer side, substantially corresponding to the inner circumference of the caulking portion 7, the fiber flow in the end of the cylindrical portion 2b forming the caulking portion 7 can extend along an axial direction. Thus, as shown in FIG. 4, since the caulked portion 7 intimately contacts against a region of the inner ring 3 from an inner circumference 3b to an end face 3d through a chamfered portion 3c without the fiber flow in the caulked portion being broken, it is possible to prevent the generation of damage, such as cracks, against the repeating stress and thus improve the strength of the caulked portion.

The steps for manufacturing the wheel hub 2 will be described more in detail.

FIG. 5 is a block diagram illustrating manufacturing steps of the wheel hub. FIG. 6 is an explanatory view of the forging step. FIG. 7 is an explanatory view of the caulking step.

1. Hot Forging

As shown in FIGS. 5 and 6, the method for manufacturing the wheel hub comprises steps of preparing a billet by cutting a bar member W of medium carbon steel (e.g. S53C) including carbon of 0.40~0.80% by weight. The bar member is axially rolled and has an axial fiber flow and a diameter of 30~60 mm. The billet is swaged by pressing both of its ends to expand its middle portion to have a barrel-like configuration after it has been heated to about 1200° C. The swaged blank is extruded to reduce its inner side diameter. The extruded blank is finish-stamped by die forging to form an outline of the wheel hub 2 including the wheel mounting flange 4, the shaft portion 26 extending from the base of the wheel mounting flange 4, and an inner circumference 23 having a partition wall A. Finally, the partition wall A is punched out to form the through bore 23'. Since the outer side wall surface 24 of the partition wall A is positioned deeply into the inner side beyond the shoulder portion 22, the fiber flow in the wheel hub 2 is formed so that it is moderately inclined from the outer side opened end to the partition wall A. In addition, the inner side wall surface 25 of the partition wall A is positioned deeply into the outer side substantially corresponding to the inner circumference of the caulking portion 7. The fiber flow in the end of the cylindrical portion 2b forming the caulking portion 7 extends along in an axial direction. The through bore 23' is formed by punching out the partition wall A by a punch. The fiber flow near the punched-out region in the inner circumference 23' is inclined substantially vertically to the axis (inner circumference 23'). However, since the outer side wall surface 24 of the partition wall A is positioned deeply into the inner circumference 23' beyond the shoulder portion 22, the fiber flow from the outer side opened end to the shoulder 22 can be extended along a substantially axial direction. Corroded scale on the surface of the wheel hub generated by the hot forging may be removed by shot blast or shot peening. It may be possible to perform thermal refining on a whole surface of the wheel hub after the forging to further improve the mechanical characteristics of the wheel hub.

2. Turning

The outer circumference including a brake/wheel pilot, the outboard raceway surface and the through bore are turned at the turning allowance of 0.5~1.5 mm. This enables the fiber flow near the inner raceway surface, from the shoulder to the outer side opened end, to extend in a substantially axial direction (maximum 5° relative to the axis: draft). Thus, it is possible to finish the fiber flow to have a substantially axial direction.

3. Boring

Apertures for hub bolts to mount a wheel are formed by boring or drilling the wheel mounting flange at 4~6 positions equidistantly apart along the periphery of the wheel mounting flange.

4. High Frequency Induction Heat Treatment

A region from the base of the wheel mount flange to the cylindrical portion (except for the caulking portion) through the corner R (round) portion (seal land portion) of the shaft portion, the inner raceway surface and the shoulder portion is hardened by high frequency induction heat treatment to have a hardened layer with a surface hardness of 58~64 HRC and a depth of 0.5~4 mm. This improves the rolling fatigue life of the raceway surface and the durability of the outer circumference of the shaft portion.

5. Broaching

The serrations of the wheel hub engaging the serrations formed on the constant velocity universal joint are formed by broaching on the through bore of the shaft portion.

6. Grinding

A region from the base of the wheel mount flange to the cylindrical portion through the corner R portion (seal land portion) of the shaft portion, the inner raceway surface, the shoulder portion and the corner R portion of the shoulder portion is simultaneously ground using a formed grinding wheel. The corner R portion connecting the shoulder and the cylindrical portion is formed by single radius of curvature or complex radii of curvature and smoothly connects them to reduce the stress concentration. The raceway surface is super finished to have a surface roughness of 0.08 Ra or less.

7. Assembling

The wheel hub is inserted into the outer member after the rolling elements/cage assembly and the outer side seal have been assembled. The inner side seal is assembled into the outer member after the inner ring is press-fit onto the wheel hub until the inner ring abuts against the shoulder portion. Thus, a sub-assembly of the wheel bearing apparatus before caulking is finished by setting the pre-load of the bearing at predetermined value of (2 kN or more, 8 kN or less, preferably 3~6 kN).

8. Caulking

FIGS. 5 and 7 show a so-called swing-caulking method where a caulking tool is pushed onto the end of the cylindrical portion of the wheel hub. The cylindrical end of the cylindrical portion is plastically deformed radially outward by applying a swing and rotating motion to the tool to form a caulked portion. The caulked portion intimately contacts the inner circumference of the inner ring, its chamfered portion and end face. Thus, the inner ring is united to the wheel hub under the clamping force of 10~40 kN.

A second preferable embodiment will be described.

FIG. 8 is a longitudinal section view of a second embodiment of the wheel bearing apparatus for a vehicle. The wheel bearing apparatus in this embodiment is for a driven wheel. The same reference numerals are used in this embodiment that relate to the same components of the first embodiment.

Similar to the first embodiment, the partition wall A of this embodiment is punched out. However, only a simple through bore is formed on the inner circumference 27 of the wheel hub 2 and no serrations are formed in the bore.

Also in this embodiment the fiber flow near the inner circumference of the wheel hub is arranged along the axis of the wheel hub in a region from the shoulder portion 22 to the outer side opened end face 29. Accordingly, the fiber flow near the inner circumference of the wheel hub 2 is arranged substantially in an axial direction (maximum 5° relative to the axis of the wheel hub: draft). The fiber flow in the end of the cylindrical portion 2b, forming the caulked portion 7, is also arranged substantially in an axial direction.

The wheel hub of the wheel bearing apparatus of the present disclosure can be applied to the bearing apparatus of third generation types where the wheel hub has wheel mounting flange on one end. The wheel hub is formed with one inner raceway surface on the outer circumference of the shaft portion that extends from the base of the wheel mounting flange toward the inner side. The cylindrical portion axially extends from the inner raceway surface, via the shoulder portion.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A wheel hub of wheel bearing apparatus comprising:
an outer member formed, on its inner circumference, with double row outer raceway surfaces;
an inner member including a wheel hub and an inner ring, the wheel hub having a wheel mounting flange at one end, a shaft portion axially extending from a base of the wheel mounting flange toward the inner side of the wheel bearing apparatus, an inner raceway surface arranged opposite to one of the double row outer raceway surfaces formed on the outer circumference of the shaft portion, a cylindrical portion axially extending from the inner raceway surface, via a shoulder portion, toward the inner side of the wheel bearing apparatus, and a through bore formed on the wheel hub inner circumference with a serration for torque transmission, the inner ring press-fit onto the cylindrical portion abutting against the shoulder portion of the wheel hub and the inner ring formed, on its outer circumference, with another inner raceway surface arranged opposite to the other of the outer raceway surfaces;
double row rolling elements contained between the inner and outer raceway surfaces of the inner member and the outer member; and
fiber flow near the inner circumference of material forming the wheel hub from the shoulder to the open end surface of the wheel hub is in a condition substantially parallel to the axis of the wheel hub.

2. The wheel hub of a wheel bearing apparatus of claim 1, wherein the fiber flow in a longitudinal section of the wheel hub at its shoulder portion is in a condition substantially parallel to the axis of the wheel hub.

3. The wheel hub of a wheel bearing apparatus of claim 2, wherein the inner ring is axially secured by a caulked portion formed by plastically deforming the end of the cylindrical portion of the wheel hub, and wherein the caulked portion intimately contacts against a region of the inner ring from an inner circumference to an end face through a chamfered portion without the fiber flow in the caulked portion being broken.

4. The wheel hub of a wheel bearing apparatus of claim 1, wherein the inner ring is axially secured by a caulked portion formed by plastically deforming the end of the cylindrical portion of the wheel hub, and wherein the caulked portion intimately contacts against a region of the inner ring from an inner circumference to an end face through a chamfered portion without the fiber flow in the caulked portion being broken.

5. A wheel hub of wheel bearing apparatus comprising:
an outer member formed, on its inner circumference, with double row outer raceway surfaces;
an inner member including a wheel hub and an inner ring, the wheel hub having a wheel mounting flange at one end, a shaft portion axially extending from a base of the wheel mounting flange toward the inner side of the wheel bearing apparatus, an inner raceway surface arranged opposite to one of the double row outer raceway surfaces formed on the outer circumference of the shaft portion, a cylindrical portion axially extending from the inner raceway surface, via a shoulder portion, toward the inner side of the wheel bearing apparatus, and a through bore formed on the wheel hub inner circumference, the inner ring press-fit onto the cylindrical portion abutting against the shoulder portion of the wheel hub and the inner ring formed on its outer circumference with another inner raceway surface arranged opposite to the other of the outer raceway surfaces;
double row rolling elements contained between the inner and outer raceway surfaces of the inner member and the outer member; and
fiber flow near the inner circumference of material forming the wheel hub from the shoulder to the open end surface of the wheel hub is in a condition substantially parallel to the axis of the wheel hub.

6. The wheel hub of a wheel bearing apparatus of claim 5, wherein the fiber flow in a longitudinal section of the wheel hub at its shoulder portion is in a condition substantially parallel to the axis of the wheel hub.

7. The wheel hub of a wheel bearing apparatus of claim 6, wherein the inner ring is axially secured by a caulked portion formed by plastically deforming the end of the cylindrical portion of the wheel hub, and wherein the caulked portion intimately contacts against a region of the inner ring from an inner circumference to an end face through a chamfered portion without the fiber flow in the caulked portion being broken.

8. The wheel hub of a wheel bearing apparatus of claim 5, wherein the inner ring is axially secured by a caulked portion formed by plastically deforming the end of the cylindrical portion of the wheel hub, and wherein the caulked portion intimately contacts against a region of the inner ring from an inner circumference to an end face through a chamfered portion without the fiber flow in the caulked portion being broken.

9. A method for manufacturing a wheel hub of a wheel bearing wherein a wheel hub has a wheel mounting flange at one end, a shaft portion axially extending from a base of the wheel mounting flange toward the inner side of the wheel bearing apparatus, an inner raceway surface formed on the outer circumference of the shaft portion, a cylindrical portion axially extending from the inner raceway surface, via a shoulder portion, toward the inner side of the wheel bearing apparatus, and a through bore alone or a through bore formed on its inner circumference with a serration for torque transmission, said method comprises steps of:

cutting a bar member that is axially rolled and includes a fiber flow in an axial direction in a direction vertical to that of the fiber flow to form a billet;

heating said billet formed by cutting the bar member;

swaging said billet by pressing both ends to expand its middle portion to have a barrel-like configuration;

extruding the swaged blank to reduce its inner side diameter;

finish-stamping the extruded blank by die forging to form an outline of the wheel hub including the wheel mounting flange, the shaft portion, the shoulder portion, the cylindrical portion, and an inner circumference having a partition wall, after the finish-stamping step the partition wall is formed so that its outer side wall surface is positioned more inner side than the position of the shoulder portion; and punching out the partition wall to form the through bore.

10. The method of manufacturing the wheel hub of a wheel bearing apparatus of claim 9, wherein the inner side wall surface of the partition wall is arranged at a deep position from the end of the caulked portion.

* * * * *

UNITED STATES PATENT AND TRADEMARK OFFICE
CERTIFICATE OF CORRECTION

| | | |
|---|---|---|
| PATENT NO. | : 7,891,879 B2 | Page 1 of 1 |
| APPLICATION NO. | : 12/487777 | |
| DATED | : February 22, 2011 | |
| INVENTOR(S) | : Isao Hirai et al. | |

It is certified that error appears in the above-identified patent and that said Letters Patent is hereby corrected as shown below:

Column 4
Line 64 "Wheel" should be --wheel--

Column 8
Line 4 "N" should be --(not shown)--

Signed and Sealed this
Thirtieth Day of August, 2011

David J. Kappos
*Director of the United States Patent and Trademark Office*